(12) United States Patent
Tsai

(10) Patent No.: US 6,577,410 B1
(45) Date of Patent: Jun. 10, 2003

(54) MULTIPLE RESOLUTION SCANNING DEVICE

(76) Inventor: Shui-Chuan Tsai, No. 3, Alley 80, Lane 108, Sec. 1, Kuang-Fu Road, Hsin-Chu (TW)

( * ) Notice: Subject to any disclaimer, the term of this patent is extended or adjusted under 35 U.S.C. 154(b) by 0 days.

(21) Appl. No.: 09/538,130

(22) Filed: Mar. 29, 2000

(51) Int. Cl.[7] .............................. H04N 1/04; H04N 1/00; H04N 9/47
(52) U.S. Cl. ................... 358/474; 358/474; 358/475; 358/483; 358/408; 348/143; 348/150
(58) Field of Search .................................. 358/474, 475, 358/483, 408, 487, 496, 497; 348/143, 150

(56) References Cited

U.S. PATENT DOCUMENTS

| | | | | |
|---|---|---|---|---|
| 3,935,380 A | * | 1/1976 | Coutta | 348/150 |
| 5,880,844 A | * | 3/1999 | Seng | 356/613 |
| 6,075,584 A | * | 6/2000 | Tsai | 355/18 |

* cited by examiner

Primary Examiner—Edward Coles
Assistant Examiner—H. Safaipour
(74) Attorney, Agent, or Firm—Pro-Techtor International Services

(57) ABSTRACT

A multiple resolution scanning device, comprising: a lens group, having a light source for illuminating the scanned object; at least two lenses of different resolutions; and a detector group, having for each of the lenses a corresponding detector. The lenses generate images of the scanned object that are focused on the corresponding detectors. The at least two lenses generate images from different scanned areas, so that the lenses generate images of the scanned object from different locations.

8 Claims, 8 Drawing Sheets

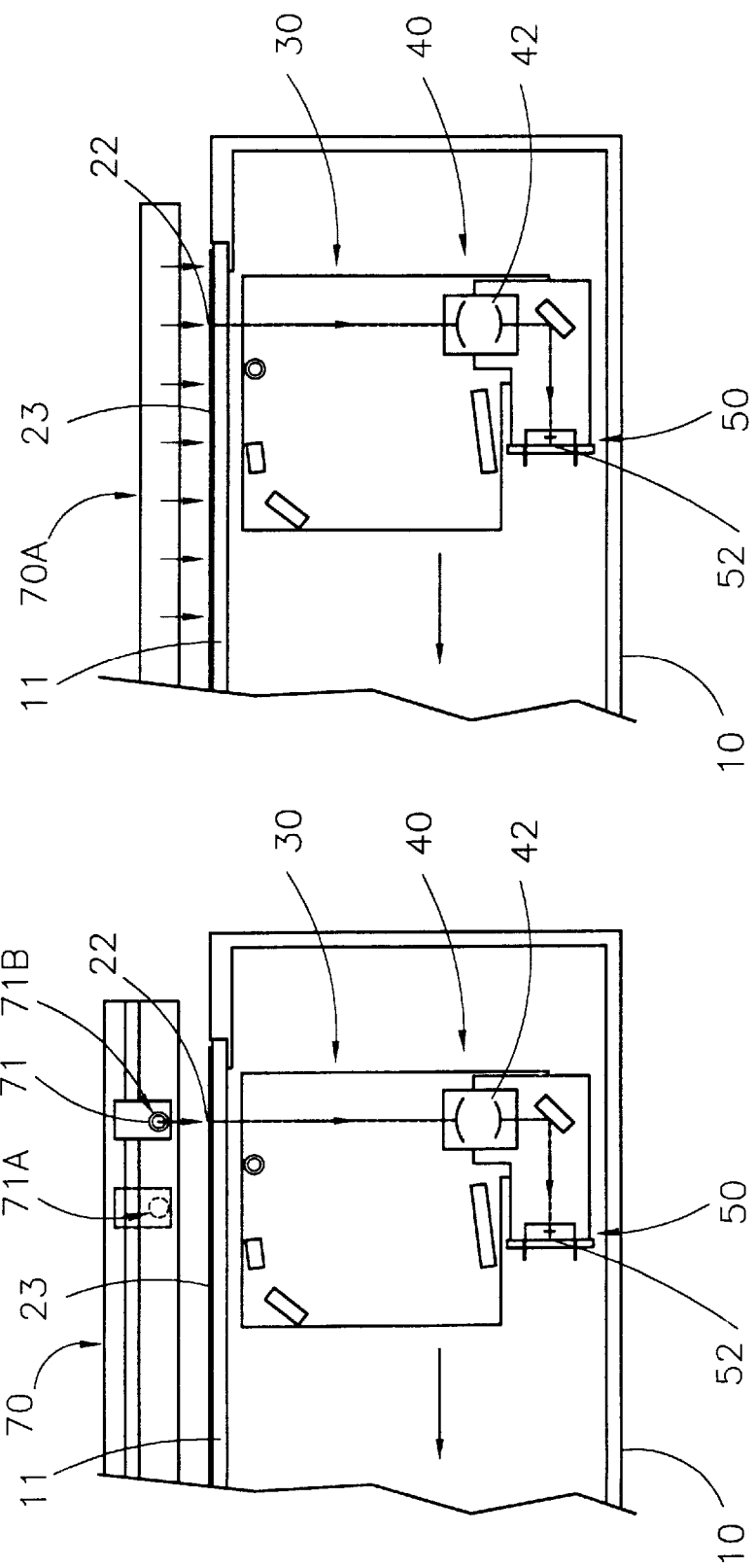

MULTIPLE RESOLUTION SCANNING DEVICE

BACKGROUND OF THE INVENTION

1. Field of the Invention

The present invention relates to a multiple resolution scanning device, particularly to a multiple resolution scanning device, which allows to shift resolutions without using mechanical means.

2. Description of Related Art

A scanning device used in a conventional scanner provides scanning of a scanned object at a single resolution only. Scanning at various resolutions requires using different scanners to accommodate needs for various resolutions. For example, scanners for the popular A4 format and for negative films have been brought on the market.

Multiple resolution scanners have appeared on the market to meet the demand for various resolutions in a single device. A conventional multiple resolution scanner usually has a lens group of lenses of different resolutions, a mirror group, a detector (charge coupled device), and a driving device to shift the lenses of the lens group. The driving device moves the lens group, bringing one of the lenses of the lens group on front of the detector for scanning at a specific resolution. Although conventional multiple resolution scanners allow scanning at various resolutions, space is needed for accommodating the moving lens group and the driving device, requiring a large volume of the scanner. Furthermore, since the lenses are movable, positions thereof are not stable, impairing quality of scanned images.

In U.S. patent application Ser. No. 09/087,328 a multiple resolution scanning device has been disclosed, having a plurality of lenses of various resolutions, a plurality of detectors, one detector for each lens, and a mirror group, consisting of a plurality of mirrors. The lenses are mounted in fixed positions, each on front of one detector. A multiplexer transmits signals from one of the detectors to a signal processing unit. Thus scanned objects are read by scanning at one of several resolutions.

Since the lens group of this multiple resolution scanning device is not moved, no driving device is needed, reducing the volume of the scanning device. The lenses are fixed relative to the detectors, ensuring high image quality. However, the multiple resolution scanning device uses various light paths for the various resolutions, each passing through one of the lenses. To avoid interference between the various light paths, the lenses have to be placed apart from each other in an appropriate arrangement.

Furthermore, at various resolutions, the scanned objects are scanned at equal scanned areas. Then the light paths through all the lenses partially overlap using common areas of the mirrors, and the lenses need to be adapted accordingly to the mirrors. This leads to a complicated arrangement of the lenses and the mirrors, resulting in a greater number of mirrors and an increased volume.

SUMMARY OF THE INVENTION

It is the main object of the present invention to provide a multiple resolution scanning device with a simplified mirror group, requiring less volume.

Another object of the present invention is to provide a multiple resolution scanning device of simple design and structure.

The present invention can be more fully understood by reference to the following description and accompanying drawings.

BRIEF DESCRIPTION OF THE DRAWINGS

FIG. 8 is a schematic illustration of the multiple resolution scanning device of the present invention in the third embodiment at a higher resolution.

FIG. 9 is a schematic illustration of the multiple resolution scanning device of the present invention in the fourth embodiment.

DETAILED DESCRIPTION OF THE PREFERRED EMBODIMENTS

Figure 1:
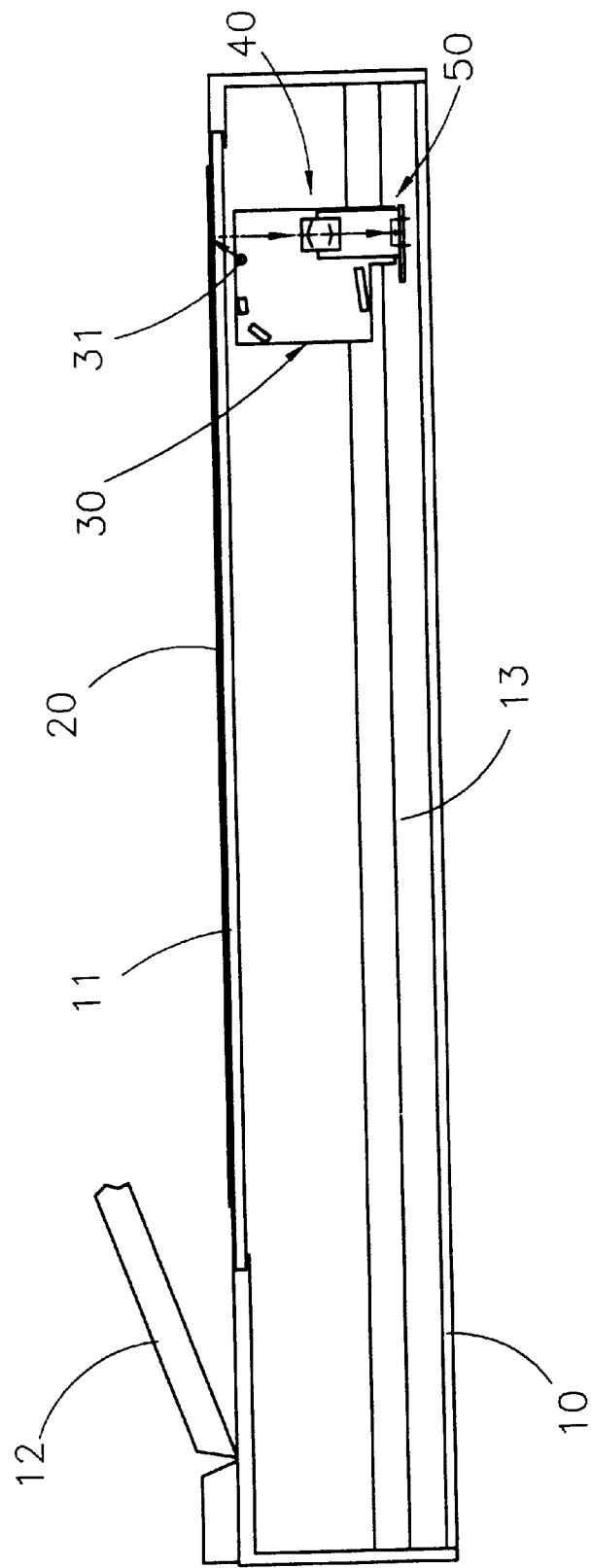
FIG. 1 is a side view of the multiple resolution scanning device of the present invention in the first embodiment in conjunction with a scanner.

As shown in FIG. 1, the multiple resolution scanning device of the present invention is a scanning device 30 used in conjunction with a scanner, having a main body 10 with a top side, on which a carrier plate 11 is mounted for carrying a scanned object 20; a cover 12, covering the carrier plate 11; at least one rail 13 inside the main body 10, guiding the scanning device 30 in a scanning movement for scanning the scanned object 20; and a driving device (not shown), driving the scanning movement of the scanning device 30 along the rail 13.

Figure 2:
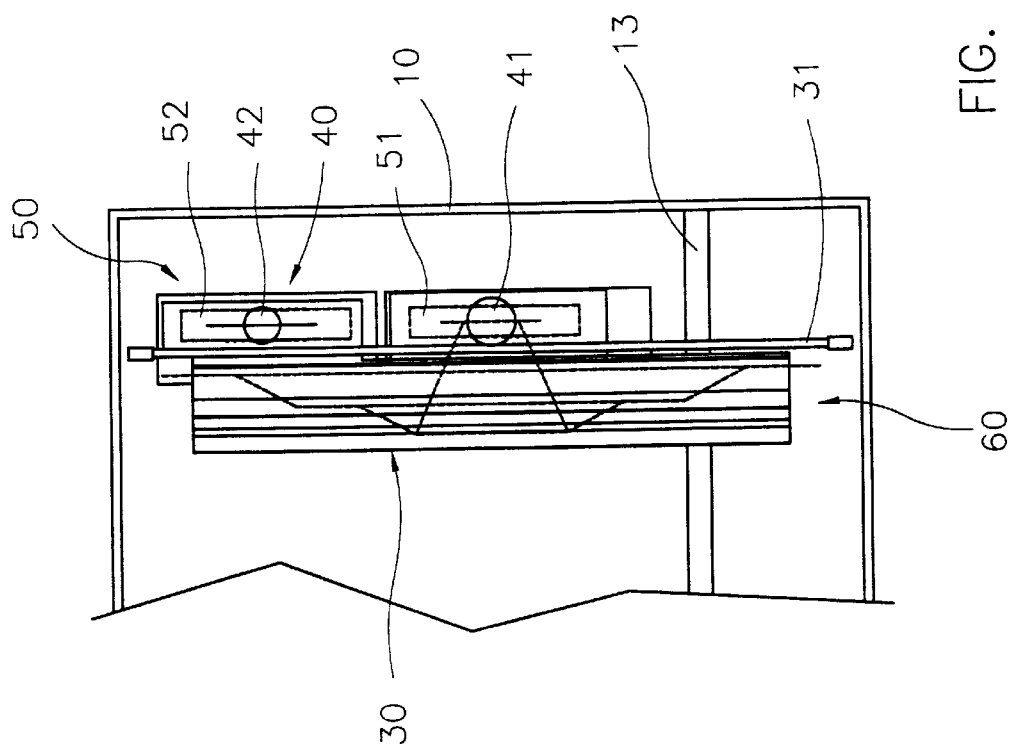
FIG. 2 is a top view of the multiple resolution scanning device of the present invention in the first embodiment.

As shown in FIG. 2, the multiple resolution scanning device 30 of the present invention mainly comprises: a light source 31, illuminating the scanned object 20; a lens group 40, consisting of at least two lenses 41, 42 of different resolutions; and a detector group 50, consisting of at least two detectors 51, 52. Each of the at least two lenses 41, 42 corresponds to one of the at least two detectors 51, 52. The lens group 40 and the detector group 50 are mounted at fixed positions. A control circuit (not shown) controls the at least two detectors 51, 52, transmitting signals therefrom to an image processing unit, allowing controlling of resolutions.

Figure 3:
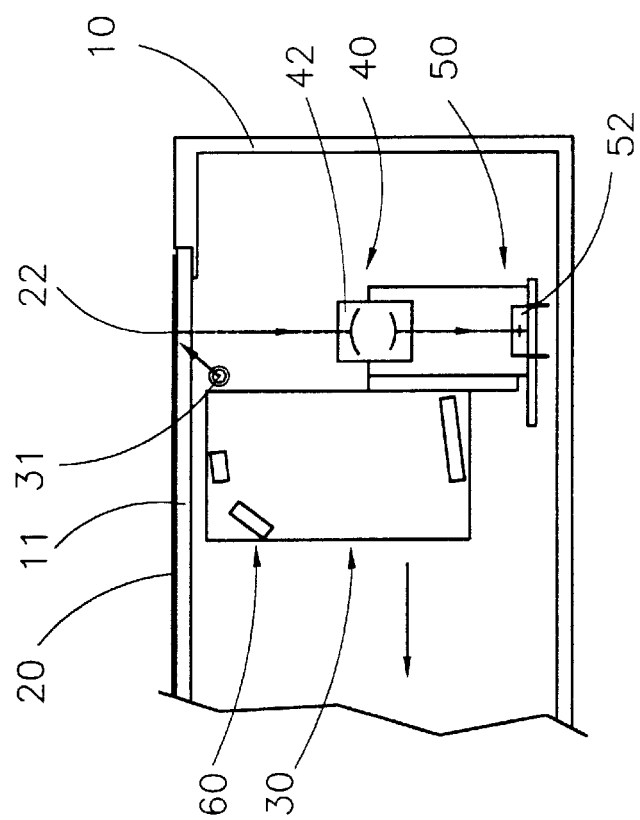
FIG. 3 is a schematic illustration of the multiple resolution scanning device of the present invention in the first embodiment at the lowest resolution.
Figure 4:
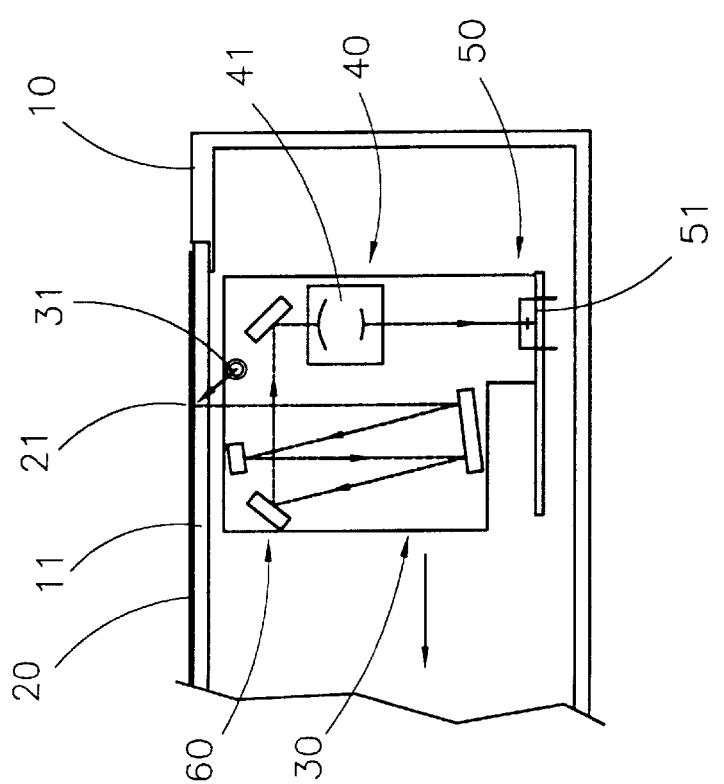
FIG. 4 is a schematic illustration of the multiple resolution scanning device of the present invention in the first embodiment at a higher resolution.

Referring to FIGS. 3 and 4, the main characteristic of the present invention is that the lenses 41 and 42 of the lens group 40 during scanning of the scanned object 20 receive light from the light source 31 that is reflected at different areas of the scanned object 20. Therefore, at any moment light paths come from different areas of the scanned object 20 and pass through the lenses 41 and 42, therefore being completely different. The lenses 41 and 42 are independent from each other, allowing to arrange the lenses 41, 42 and corresponding mirrors freely.

As shown in FIG. 3, the present invention in a first embodiment has a mirror group 60 that is used in a lowest resolution. The lens 41 generates at the detector 51 an image of the scanned object 20 located at a first scanned area 21 on the carrier plate 11. Light from the light source 31 is reflected from the first scanned area 21 onto the mirror group 60, directed by the mirror group 60 on the lens 41 and transmitted by the lens 41 on the detector 51, where an image of the scanned object 20 is generated. In the first embodiment of the present invention, the lens 41 works at the lowest resolution, accordingly an image of a relatively large area is generated, resulting in a long light path. Then a large number of mirrors in the mirror group 60 are required to keep the scanning device 30 at a small volume.

As shown in FIG. 4, at a higher resolution, the lens 42 generates at the detector 52 an image of the scanned object 20 located at a second scanned area 22 on the carrier plate 11. Light from the light source 31 is reflected from the second scanned area 22 directly on the lens 42 and transmitted by the lens 42 on the detector 52, where an image of the scanned object 20 is generated. In the higher resolution, an image of a relatively small area is generated, resulting in a shorter light path. Then a smaller number of mirrors are required, or mirrors can entirely dispensed with, as shown in FIG. 4.

Figure 5:
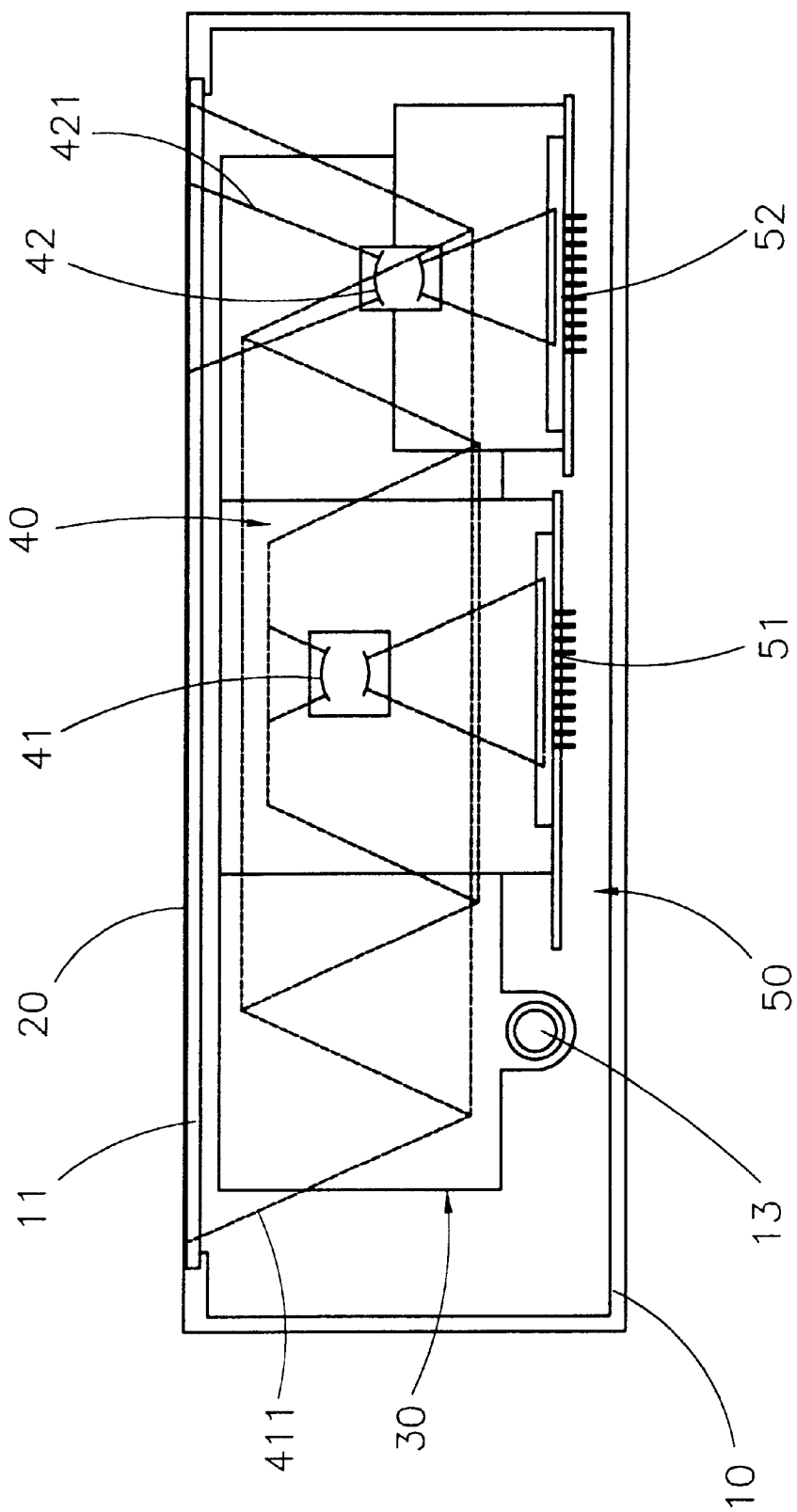
FIG. 5 is a front view of the multiple resolution scanning device of the present invention in the first embodiment, showing light paths at various resolutions.

Referring to FIG. 5, the various resolutions have light paths 411, 421 that are distinct from each other. Since the lenses 41 and 42 receive light from different scanned areas, the light paths 411, 421 have minimum overlap. Therefore, no interference of light paths occurs, and a simpler arrangement of lenses is possible, so that the volume of the scanning device 30 is significantly reduced.

The independent optical setups of the lenses 41 and 42 facilitate designing the arrangement of the lenses 41, 42 and of the mirror group 60, simplifies the system and allows for a lower number of mirrors. Since in the first embodiment of the present invention at the higher resolution no mirrors are needed, any possible distortion by mirrors is avoided, improving scanning quality.

Figure 6:
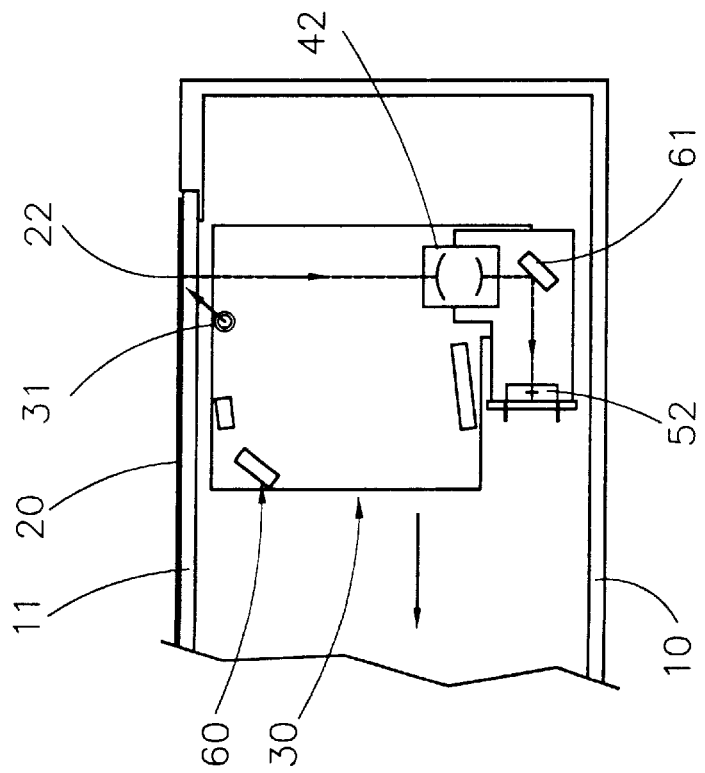
FIG. 6 is a schematic illustration of the multiple resolution scanning device of the present invention in the second embodiment.

Referring to FIG. 6, the present invention in a second embodiment has a modified mirror group 60 that further comprises at least one mirror 61. The mirror 61 deflects light transmitted by the lens 42 (or 41) to be focused on the detector 52 (or 51). The additional mirror 61 in the second embodiment allows to place the detectors 51, 52 at locations that are not on optical axes of the lenses 41, 42. This enhances flexibility and allows a design of the scanning device 30 with further reduced height.

Figure 7:
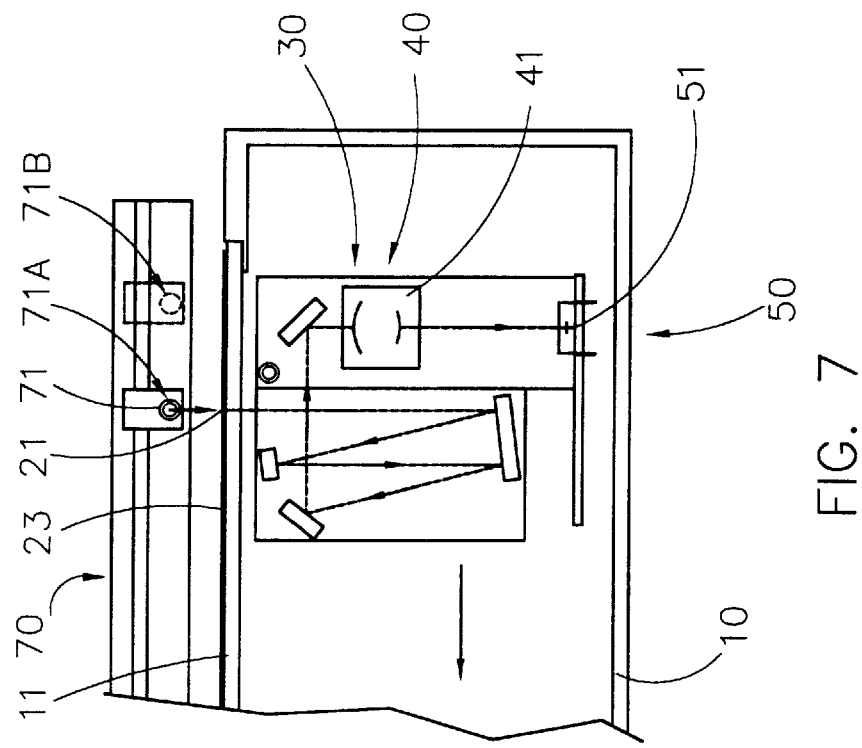
FIG. 7 is a schematic illustration of the multiple resolution scanning device of the present invention in the third embodiment at the lowest resolution.

Referring to FIGS. 7 and 8, the present invention in a third embodiment enables scanning of scanned objects that transmit light, like negative films, slides or transparents. Therein, an illuminating cover 70 is installed above the carrier plate 11. At least one transmission light source 71 is built into the illuminating cover 70, illuminating a transparent scanned object 23. The transmission light source 71 is a movable light source, moved by a driving device (not shown) and illuminating an area of the transparent scanned object 23. At the lowest resolution, as shown in FIG. 7, the transmission light source 71 is moved to a first location 71A above the first scanned area 21. At a higher resolution, as shown in FIG. 8, the transmission light source 71 is moved to a second location 71B above the second scanned area 22. Thus the transmission light source 71 illuminates the first and second scanned areas 21, 22 of the transparent scanned object 23 at different resolutions, from where light is sent to the lenses 41 and 42, respectively. Thus scanning transparent objects at different resolutions is achieved.

Referring to FIG. 9, the present invention in a fourth embodiment, like in the third embodiment enables scanning of scanned objects that transmit light. In the fourth embodiment, in contrast to the third embodiment, light is generated by a light box 70A. The light box 70A is an area-like light source, illuminating the first and second scanned areas 21, 22 without needing to be moved.

Figures 10, 11:
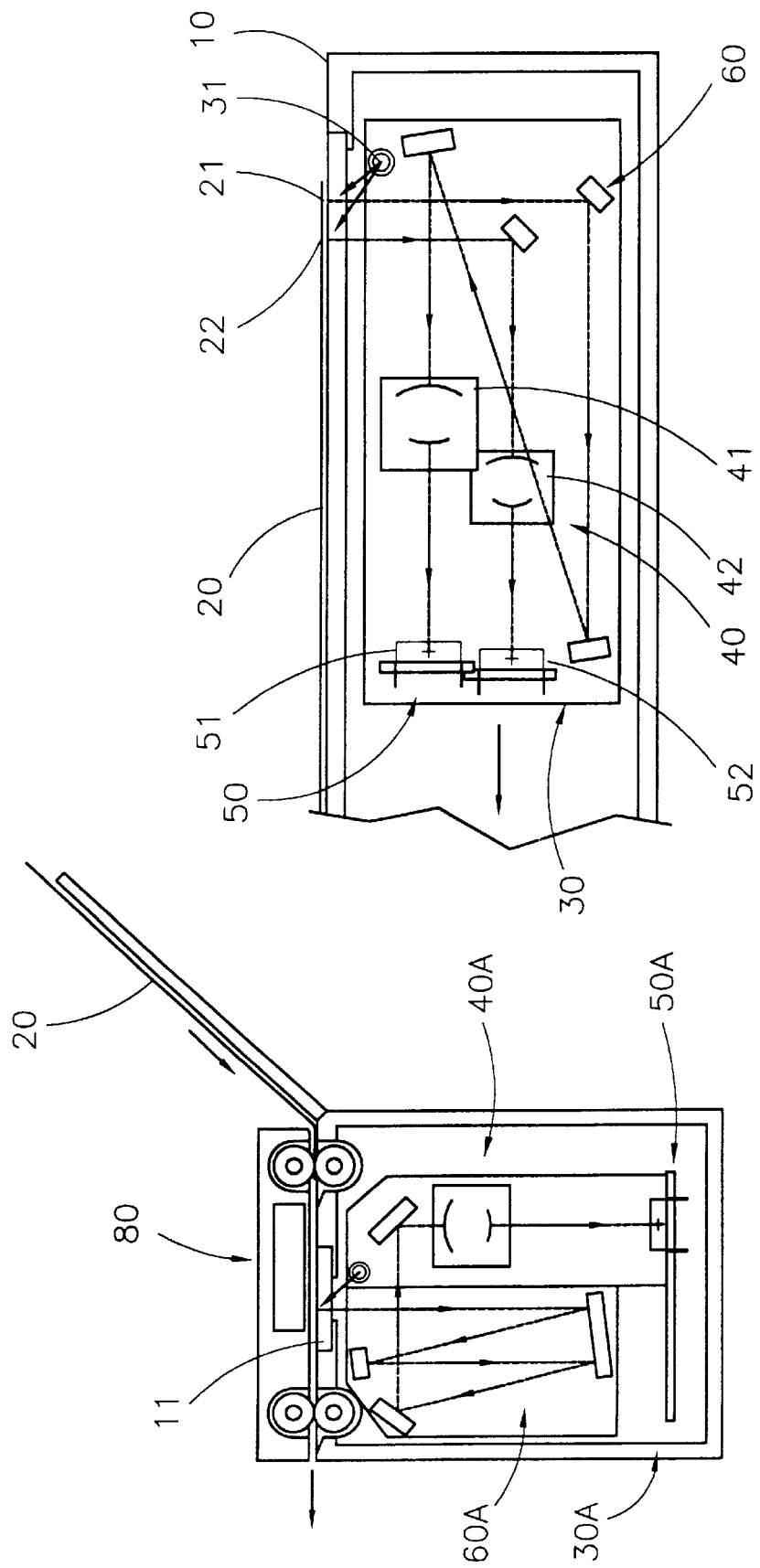
FIG. 10 is a schematic illustration of the multiple resolution scanning device of the present invention in the fifth embodiment.
FIGS. 11 and 12 are schematic illustrations of the multiple resolution scanning device of the present invention in the sixth embodiment.

Referring to FIG. 10, the present invention in a fifth embodiment is used in conjunction with a sheet feed scanner, having a scanning device 30A that is mounted in a fixed position. A paper feeding system 80 guides the scanned object 20 over the scanning device 30A. The scanning device 30A has a lens group 40A, a detector group 50A and a mirror group 60A which are equal to the lens group 40, the detector group 50 and the mirror group 60 of the first embodiment, respectively. At different resolutions, scanned areas of the scanned object 20 are different, as well. In contrast to the first through fourth embodiments, where during scanning the scanning device 30 moves along the scanned object 20, the scanning device 30A of the fifth embodiment has a fixed position, with the scanned object 20 moving to be scanned.

Figure 12:
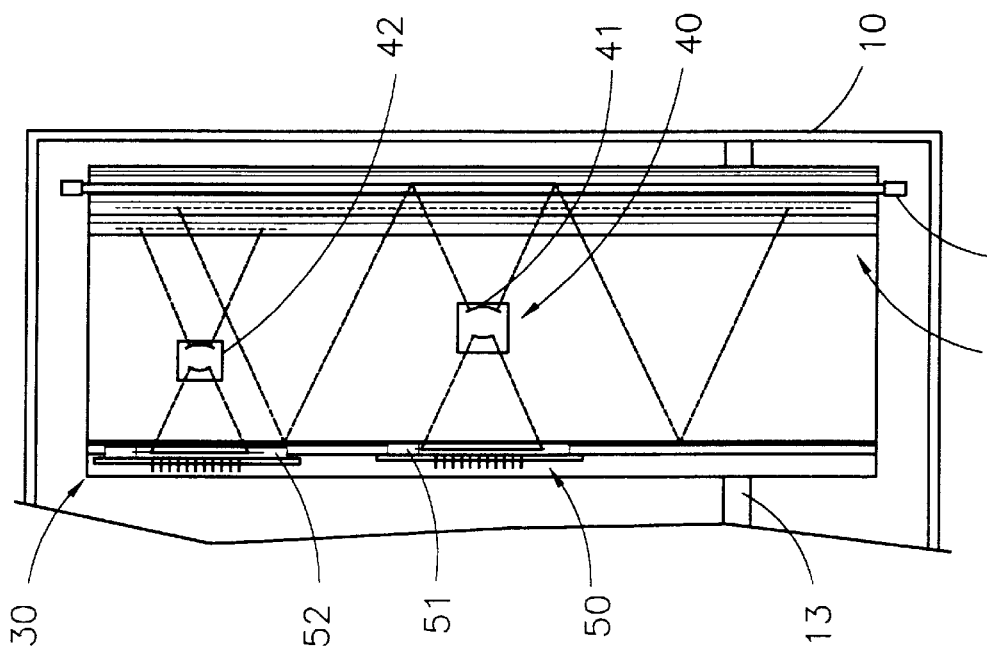

Referring to FIGS. 11 and 12, the present invention in a sixth embodiment has the lens group 40, the detector group 50 and the mirror group 60 arranged within the scanning device 30 in a different way. In contrast to the first through the fifth embodiment of the present invention, the first scanning area 21 and the second scanning area 22 are located on a common side of the light source 31, whereas in the first through the fifth embodiment, the first scanning area 21 and the second scanning area 22 are located on different sides of the light source 31.

While the invention has been described with reference to preferred embodiments thereof, it is to be understood that modifications or variations may be easily made without departing from the spirit of this invention that is defined by the appended claims.

What is claimed is:

1. A multiple resolution scanning device for scanning a scanned object, comprising:
    a light source, illuminating said scanned object;
    a lens group, having at least two lenses of different resolutions, which generate images of said scanned object; and
    a detector group, having for each of said lenses a corresponding detector, with each of said lenses generating an image of said scanned object on said corresponding detector thereof, from where output signals are generated;
    wherein said at least two lenses of said lens group generate images of said scanned object from different scanned areas at said corresponding detectors thereof.

2. A multiple resolution scanning device according to claim 1, wherein between each of said lenses and said corresponding detector thereof a mirror is inserted, so that light from each of said lenses is deflected onto said corresponding detector thereof.

3. A multiple resolution scanning device according to claim 1, wherein said light source is a reflection light source, generating light that is reflected on said scanned object and subsequently falls on said lenses.

4. A multiple resolution scanning device according to claim 1, wherein said light source is a transmission light source, generating light that passes through said scanned object and subsequently falls on said lenses.

5. A multiple resolution scanning device according to claim 4, wherein said transmission light source is a light box.

6. A multiple resolution scanning device according to claim 4, wherein said transmission light source is a movable light source.

7. A multiple resolution scanning device according to claim 1, further comprising a carrier plate for carrying said scanned object in a fixed position, said lens group and said detector group moving parallel to said carrier plate to generate an image of said scanned object.

8. A multiple resolution scanning device according to claim 1, wherein said lens group and said detector group are mounted in fixed positions, with a paper sheet feeder moving said scanned object past said lens group and said detector group.

* * * * *